(12) United States Patent
Lee

(10) Patent No.: US 10,439,536 B2
(45) Date of Patent: Oct. 8, 2019

(54) APPARATUS AND METHOD FOR ESTIMATING INITIAL POSITION OF ROTOR OF MOTOR

(71) Applicant: LSIS CO., LTD., Anyang-si, Gyeonggi-do (KR)

(72) Inventor: Hakjun Lee, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/855,646

(22) Filed: Dec. 27, 2017

(65) Prior Publication Data
US 2018/0262140 A1    Sep. 13, 2018

(30) Foreign Application Priority Data
Mar. 7, 2017    (KR) .................. 10-2017-0028623

(51) Int. Cl.
*H02P 6/08*    (2016.01)
*H02P 21/18*    (2016.01)
*H02P 21/14*    (2016.01)
(Continued)

(52) U.S. Cl.
CPC .............. *H02P 21/18* (2016.02); *H02P 6/183* (2013.01); *H02P 21/34* (2016.02); *H02P 21/32* (2016.02); *H02P 2203/11* (2013.01)

(58) Field of Classification Search
CPC .......... H02P 6/085; H02P 21/14; H02P 21/18; H02K 1/145
See application file for complete search history.

(56) References Cited

U.S. PATENT DOCUMENTS

| 8,541,971 B2 | 9/2013 | Sakai et al. |
| 2002/0060548 A1* | 5/2002 | Iwaji .................. H02P 6/085 318/727 |

(Continued)

FOREIGN PATENT DOCUMENTS

| JP | 2001268974 A | 9/2001 |
| JP | 2002078392 A | 3/2002 |

(Continued)

OTHER PUBLICATIONS

European Search Report for related European Application No. 17203088.4; action dated Jul. 11, 2018; (9 pages).

(Continued)

*Primary Examiner* — Eduardo Colon Santana
*Assistant Examiner* — Cortez M Cook
(74) *Attorney, Agent, or Firm* — K&L Gates LLP

(57) ABSTRACT

An initial position estimating apparatus for estimating an initial position of a rotor of a motor includes: a signal processor for outputting an angular error component from a change amount of a q-axis current in an estimated rotor reference frame; a position estimator for estimating an electrical position of the rotor from the angular error component; a magnetic pole determination portion for outputting magnetic pole determination information according to a sign of a magnetic pole determination signal determined based on a change amount of a d-axis current in the estimated rotor reference frame and based on a d-axis voltage; and a first addition portion for outputting an initial position of the rotor by adding the magnetic pole determination information to the electrical position.

15 Claims, 7 Drawing Sheets

(51) Int. Cl.
*H02P 6/18* (2016.01)
*H02P 21/34* (2016.01)
*H02P 21/32* (2016.01)

(56) References Cited

U.S. PATENT DOCUMENTS

| | | | | |
|---|---|---|---|---|
| 2007/0132424 | A1* | 6/2007 | Takao | H02P 21/14 318/806 |
| 2014/0062353 | A1 | 3/2014 | Oyobe | |
| 2014/0327379 | A1 | 11/2014 | Yang et al. | |
| 2016/0149443 | A1* | 5/2016 | Hashimoto | H02K 1/145 318/400.33 |

FOREIGN PATENT DOCUMENTS

| | | |
|---|---|---|
| JP | 2002171798 A | 6/2002 |
| JP | 2005020918 A | 1/2005 |
| JP | 3687603 B2 | 8/2005 |
| JP | 2006158101 A | 6/2006 |
| JP | 3953189 B2 | 8/2007 |
| JP | 2011205832 A | 10/2011 |
| JP | 5120621 B2 | 1/2013 |
| JP | 2014200154 A | 10/2014 |

OTHER PUBLICATIONS

Jung, et al; "Sensorless Control of AC Machines at Carrier Frequency Signal Injection Using Analog Filter Circuit"; Department of Electrical and Computer Engineering, Seoul National University; Apr. 22, 2013; (6 pages).

Japanese Office Action for related Japanese Application No. 2017-242397; action dated Feb. 1, 2019; (4 pages).

* cited by examiner

APPARATUS AND METHOD FOR ESTIMATING INITIAL POSITION OF ROTOR OF MOTOR

CROSS-REFERENCE TO RELATED APPLICATION

Pursuant to 35 U.S.C. § 119(a), this application claims the benefit of an earlier filing date of and the right of priority to Korean Application No. 10-2017-0028623, filed on Mar. 7, 2017, the contents of which are incorporated by reference herein in its entirety.

BACKGROUND OF THE INVENTION

1. Field of the Invention

This specification relates to various embodiments of an apparatus and a method for estimating an initial position of a rotor of a motor.

2. Background of the Invention

Generally, a permanent magnet synchronous machine (PMSM) has been mainly used in a high performance servo application field, due to its high efficiency, its high torque and output per unitary volume, and its rapid dynamic characteristic. Since a magnetic flux of a rotor of the PMSM is generated from a permanent magnet attached to the rotor, it is necessary to correctly detect an absolute position of the magnetic flux generated from the permanent magnet, that is, an absolute position of the rotor, for precise and instantaneous control of a torque generated from the motor. Thus, absolute position information of the rotor is obtained from an absolute position detector for detecting an absolute position of the rotor, at the time of controlling the PMSM, thereby being used to perform a magnetic flux-oriented control.

However, an absolute type encoder for detecting an absolute position is more expensive than an incremental type encoder for detecting a relative position. Thus, in an industry field, such an incremental encoder is mainly preferred. In case of driving the PMSM in an industry field using an incremental encoder, an initial position of a rotor should be necessarily estimated.

SUMMARY OF THE INVENTION

Therefore, an aspect of the detailed description is to provide various embodiments of an apparatus and a method for estimating an initial position of a rotor of a motor.

To achieve these and other advantages and in accordance with the purpose of this specification, as embodied and broadly described herein, there is provided an initial position estimating apparatus for estimating an initial position of a rotor of a motor, the apparatus comprising: a signal processor for outputting an angular error component from a change amount of a q-axis current in an estimated rotor reference frame; a position estimator for estimating an electrical position of the rotor from the angular error component; a magnetic pole determination portion for outputting magnetic pole determination information according to a sign of a magnetic pole determination signal determined based on a change amount of a d-axis current in the estimated rotor reference frame and based on a d-axis voltage; and a first addition portion for outputting an initial position of the rotor by adding the magnetic pole determination information to the electrical position.

To achieve these and other advantages and in accordance with the purpose of this specification, as embodied and broadly described herein, there is also provided an initial position estimating method for estimating an initial position of a rotor of a motor, the method comprising: determining an angular error component from a change amount of a q-axis current in an estimated rotor reference frame; estimating an electrical position of the rotor from the angular error component; determining magnetic pole determination information according to a sign of a magnetic pole determination signal determined based on a change amount of a d-axis current in the estimated rotor reference frame and based on a d-axis voltage; and determining an initial position of the rotor by adding the magnetic pole determination information to the electrical position.

In various embodiments, the initial position estimating apparatus may correctly determine an initial position of the rotor of the motor by reducing a computational complexity, based on a fundamental wave component of a change amount of a d-axis current of an estimated rotor reference frame when a high frequency voltage of a square wave is applied.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
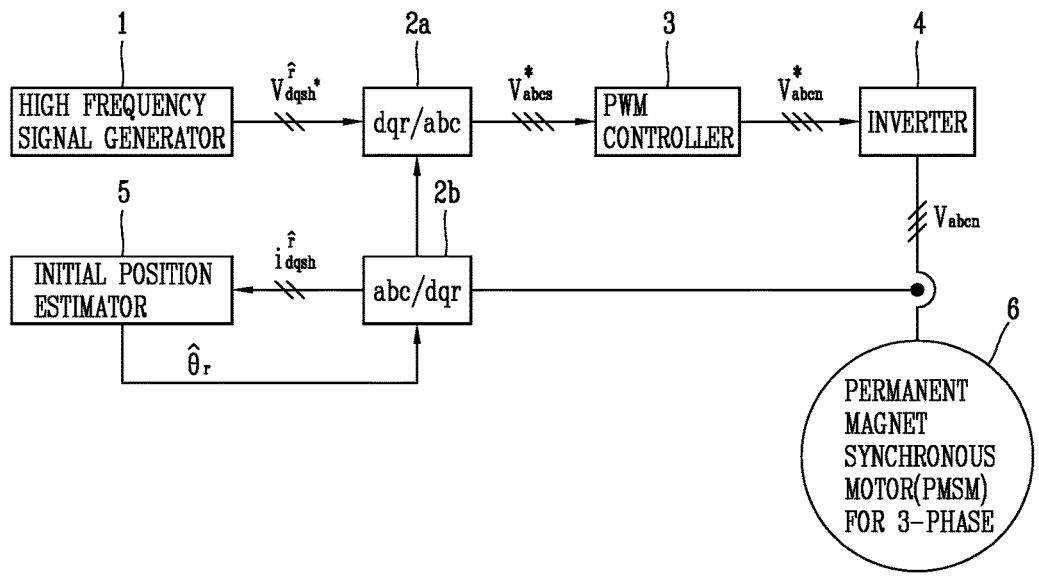
FIG. 1 is a configuration view for explaining an inverter system according to various embodiments.

Hereinafter, aspects of the disclosure will be described in detail with reference to the accompanying drawings. Here, it is noted that identical reference numerals denote the same structural elements in the accompanying drawings.

The terms and expressions used herein are for the purpose of describing particular aspects and do not limit the scope of other aspects. As used herein, singular forms may include plural forms as well, unless the context clearly indicates otherwise. Unless defined otherwise, all terms used herein, including technical and scientific terms, have the same meanings as those commonly understood by a person skilled in the art to which the disclosure pertains. Such terms as those defined in a generally used dictionary may be interpreted to have the same meanings as the contextual meanings in the relevant field of art, and are not to be interpreted to have ideal or excessively formal meanings unless clearly defined as such in the disclosure. In some cases, even the terms defined in the disclosure should not be interpreted to exclude aspects of the disclosure.

Herein, the expressions "have", "may have", "include", "may include", "comprise", or "may comprise" refer to the existence of a corresponding feature (e.g., numeral, function, operation, or constituent element such as component), and to not exclude one or more additional features.

The expressions "a first", "a second", "the first", or "the second" may modify various components regardless of the order and/or the importance but do not limit the corresponding components.

A singular expression includes a plural concept unless there is a contextually distinctive difference therebetween. In the present invention, a term of "include" or "have" should not be interpreted as if it absolutely includes a plurality of components or steps of the specification. Rather, the term of "include" or "have" may not include some components or some steps, or may further include additional components.

Unless differently defined, all the terms used herein with including technical or scientific terms have the same meaning as terms generally understood by those skilled in the art relating to the field of the present invention.

Preferred embodiments of the present invention will be explained in detail with reference to the attached drawings.

FIG. 1 is a configuration view for explaining an inverter system according to various embodiments.

Referring to FIG. 1, the inverter system may include a high frequency signal generator 1, a first converter 2a, a second converter 2b, a PWM controller 3, an inverter 4, and an initial position estimator 5. An output of the inverter 4 may be input to a permanent magnet synchronous motor (PMSM) 6.

The high frequency signal generator 1 may generate a high frequency voltage command for estimation of an initial position. An output of the high frequency signal generator 1 is $v_{dqh}^{r\,*}$, a high frequency voltage command of a d-axis and a q-axis of an estimated rotor reference frame. Here, the r is a suffix indicating a rotor reference frame, and the superscript (^) means an estimated value.

The high frequency voltage command may be represented as a vector of $$v_{dqh}^{\hat{r}\,*} = \begin{bmatrix} v_{dsh}^{\hat{r}\,*} \\ v_{qsh}^{\hat{r}\,*} \end{bmatrix}.$$

The high frequency voltage command to be applied may have various types. However, a system to which the present invention is applied adopts a method for applying a voltage of a d-axis of an estimated rotor reference frame. Thus, the high frequency voltage command may be represented as $$v_{dqh}^{\hat{r}\,*} = \begin{bmatrix} V_{inj} \cos\omega_h t \\ 0 \end{bmatrix}.$$

Here, the $V_{inj}$ represents a size of an applied voltage, and $\omega_h$ representes a frequency of an applied voltage.

The first converter 2a may convert a physical quantity of a d-axis and a q-axis of a rotor reference frame, and the second converter 2b may convert a physical quantity of abc into a physical quantity of the d-axis and the q-axis.

The first converter 2a may use the following formula 1 in order to convert an input, $v_{dqh}^{\hat{r}\,*}$ into $v^*_{abcs}$. Here, an equation of $$v^*_{abcs} = \begin{bmatrix} v^*_{as} \\ v^*_{bs} \\ v^*_{cs} \end{bmatrix}$$

is satisfied.

$$\begin{bmatrix} v^*_{as} \\ v^*_{bs} \\ v^*_{cs} \end{bmatrix} = \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\hat{\theta}_r & -\sin\hat{\theta}_r \\ \sin\hat{\theta}_r & \cos\hat{\theta}_r \end{bmatrix} \begin{bmatrix} v_{dsh}^{\hat{r}\,*} \\ v_{qsh}^{\hat{r}\,*} \end{bmatrix} \quad \text{[Formula 1]}$$

Here, the $\hat{\theta}_r$ denotes a rotor electrical angle estimated from the initial position estimator 5.

The second converter 2b may use the following formula 2 in order to convert an input, $i_{abcs}$ into $i_{dqh}^{\hat{r}}$.

$$\begin{bmatrix} i^r_{dsh} \\ i^r_{qsh} \end{bmatrix} = \frac{2}{3} \begin{bmatrix} \cos\theta_r & \sin\theta_r \\ -\sin\theta_r & \cos\theta_r \end{bmatrix} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_{as} \\ i_{bs} \\ i_{cs} \end{bmatrix}$$ [Formula 2]

Here, an equation of $$i^r_{dqsh} = \begin{bmatrix} i^r_{dsh} \\ i^r_{qsh} \end{bmatrix}$$

is satisfied, and an equation of $$i_{abcs} = \begin{bmatrix} i_{as} \\ i_{bs} \\ i_{cs} \end{bmatrix}$$

is satisfied.

Here, $\hat{\theta}_r$ denotes a rotor electrical angle estimated from the initial position estimator 5.

The PWM controller 3 may change the abc-phase voltage command $v^*_{abcs}$ into a terminal voltage command $v^*_{abcn}$, thereby outputting a switching function for PWM. Here, the operation of the PWM controller 3 will be explained later with reference to the attached drawings. A terminal voltage command may be applied to the inverter 4 in the form of a switching function, through a triangular wave comparison voltage modulation, under control of the PWM controller 3.

The initial position estimator 5 may estimate $\hat{\theta}_r$, an initial position of a rotor of the permanent magnet synchronous motor (PMSM) 6, based on a high frequency current generated by applying a high frequency voltage to the PMSM 6. The first and second converters 2a, 2b may utilize the $\hat{\theta}_r$ in coordinates conversion.

Figure 2:
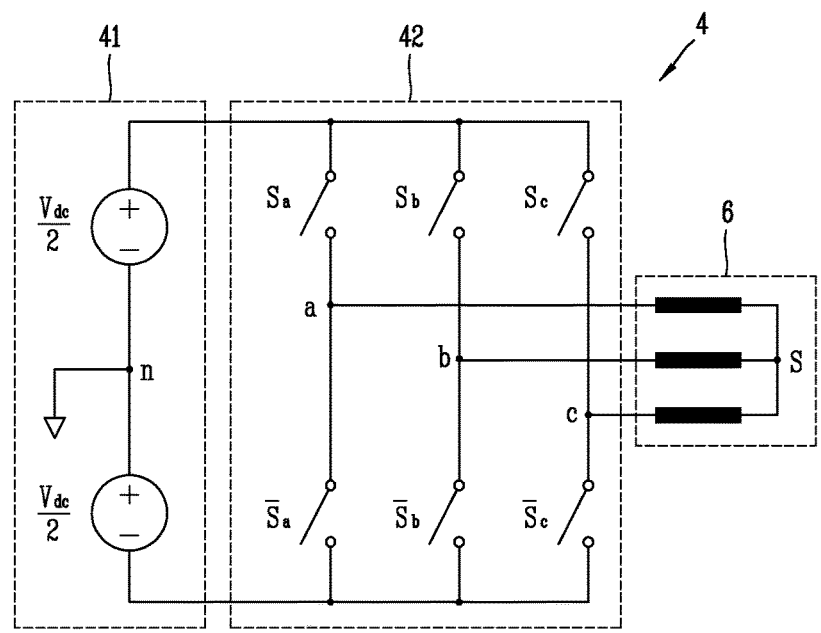
FIG. 2 is a schematic circuit diagram of an inverter shown in FIG. 1.

FIG. 2 is a schematic circuit diagram of the inverter shown in FIG. 1.

Referring to FIG. 2, an inverter portion 42 composed of a plurality of switches performs a switching with respect to a voltage of a direct current terminal 41, thereby applying the voltage to the PMSM 6, a three-phase load.

Here, the $V_{dc}$ means a voltage of the direct current terminal 41, and the n means a position of a neutral point of the virtual direct current terminal 41. Each of the $S_a$, $S_b$ and $S_c$ is a switching function of a power switch of the inverter portion 42. $S_a=1$ means a conducted state of an upper switch of an a-phase leg, and $S_a=0$ means a conducted state of a lower switch of the a-phase leg. That is, $S_a$ and $\overline{S_a}$ are complementary to each other. The same principle is applied to the $S_b$ and $S_c$.

Figure 3:
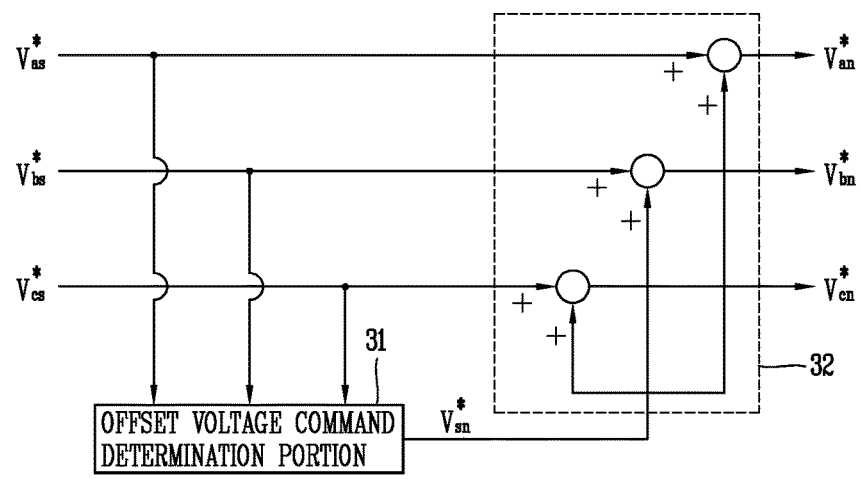
FIG. 3 is an exemplary view for explaining a configuration of a terminal voltage to be applied to a triangular wave comparison voltage modulation.

FIG. 3 is an exemplary view for explaining a configuration of a terminal voltage to be applied to a triangular wave comparison voltage modulation.

Referring to FIG. 3, relations among terminal voltage commands $v^*_{an}$, $v^*_{bn}$, $v^*_{cn}$, phase voltage commands $v^*_{as}$, $v^*_{bs}$, $v^*_{cs}$, and an offset voltage command $v^*_{sn}$ are shown in the following formula 3.

$$v^*_{an}=v^*_{as}+v^*_{sn}$$

$$v^*_{bn}=v^*_{bs}+v^*_{sn}$$

$$v^*_{cn}=v^*_{cs}+v^*_{sn}$$ [Formula 3]

That is, an offset voltage command determination portion 31 may determine an offset voltage command from 3-phase terminal voltage commands. And an addition portion 32 may add the phase voltage commands to the offset voltage command, thereby outputting the terminal voltage commands. An offset voltage is a component which commonly exists at 3-phase terminal voltages, and is a zero-phase sequence component voltage. Thus, the offset voltage does not influence on synthesis of a line-to-line voltage.

The offset voltage command determined by the offset voltage command determination portion 31 may be implemented in various manners. Representatively, an offset voltage command in a sinusoidal pulse width modulation (SPWM) is shown in the following formula 4, and an offset voltage command in a spatial vector pulse width modulation (SVPWM) is shown in the following formula 5.

$$v^*_{sn}=0$$ [Formula 4]

$$v^*_{sn} = -\frac{v_{max} + v_{min}}{2}$$ [Formula 5]

Here, the $v_{max}$ denotes a largest voltage among the 3-phase voltage commands, and the $v_{min}$ denotes a smallest voltage among the 3-phase voltage commands.

Figure 4:
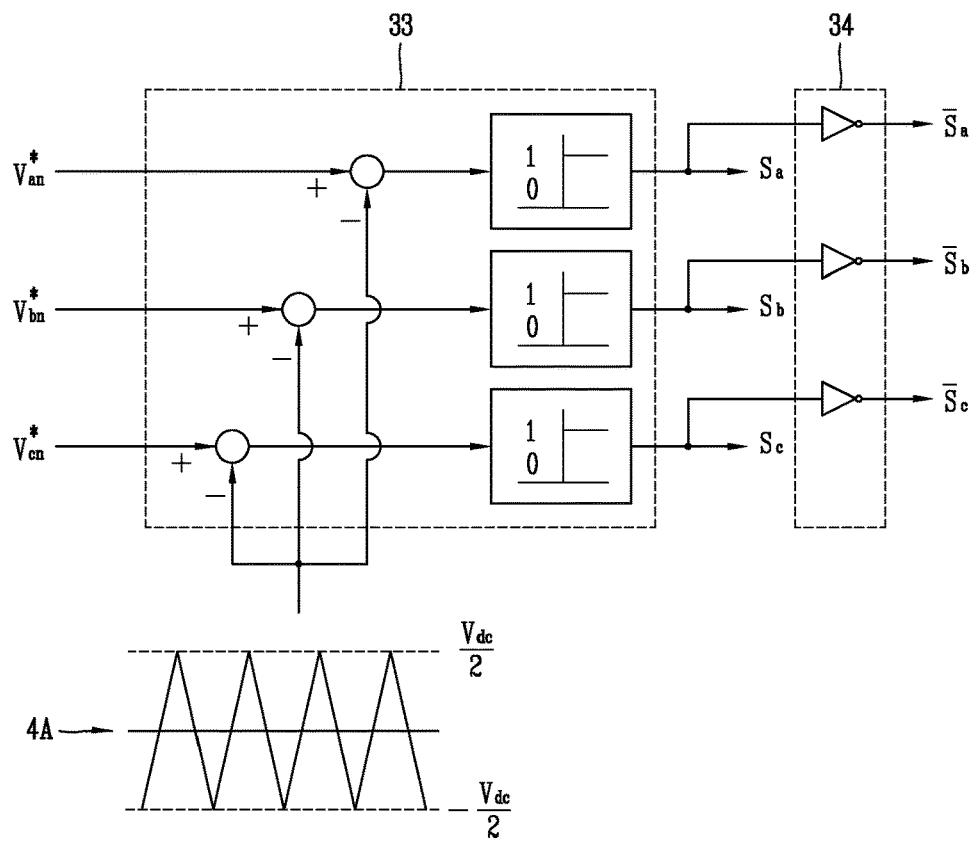
FIG. 4 is an exemplary view for explaining a triangular wave comparison voltage modulation of a PWM controller shown in FIG. 1.

FIG. 4 is an exemplary view for explaining a triangular wave comparison voltage modulation of a PWM controller shown in FIG. 1. In FIG. 4, 4A represents a triangular carrier wave to be compared with a terminal voltage command. A period of the carrier wave is the same as a switching frequency, and a maximum value and a minimum value of the carrier wave are $$\frac{V_{dc}}{2} \text{ and } \frac{-V_{dc}}{2},$$

respectively.

Referring to FIG. 4, a comparator 33 compares the triangular carrier wave with the terminal voltage command. If a difference between the terminal voltage command and the triangular carrier wave is a positive number as a result of the comparison, the comparator 33 outputs a switching function of 1. On the other hand, if the difference between the terminal voltage command and the triangular carrier wave is a negative number, the comparator 33 outputs a switching function of 0. When the triangular carrier wave is defined as $v_{tri}$, a switching function provided to an upper switch of the inverter portion 42 of the inverter 4 may be defined as the following formulas 6, 7 and 8.

$$\begin{cases} S_a = 1, & v^*_{an} \geq v_{tri} \\ S_a = 0, & v^*_{an} < v_{tri} \end{cases}$$ [Formula 6]

$$\begin{cases} S_b = 1, & v^*_{bn} \geq v_{tri} \\ S_b = 0, & v^*_{bn} < v_{tri} \end{cases}$$ [Formula 7]

$$\begin{cases} S_c = 1, & v^*_{cn} \geq v_{tri} \\ S_c = 0, & v^*_{cn} < v_{tri} \end{cases}$$ [Formula 8]

A switching function of a lower switch of a leg for one phase is complementary to a switching function of an upper switch. Thus, an inverter 34 may invert a switching function outputted from the comparator 33, and may provide the switching function to the lower switch of the inverter portion 42 of the inverter 4.

Figure 5:
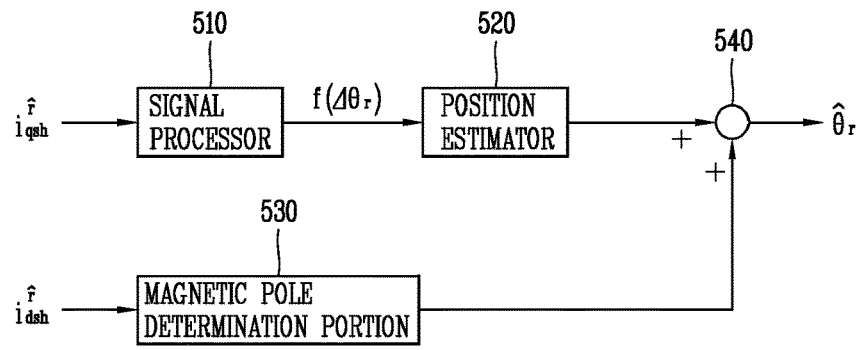
FIG. 5 is a configuration view for explaining an initial position estimator according to a first embodiment.
Figure 6:
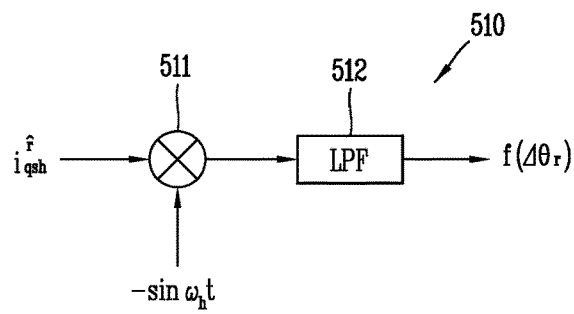
FIG. 6 is a detailed configuration view of a signal processor shown in FIG. 5.
Figure 7:
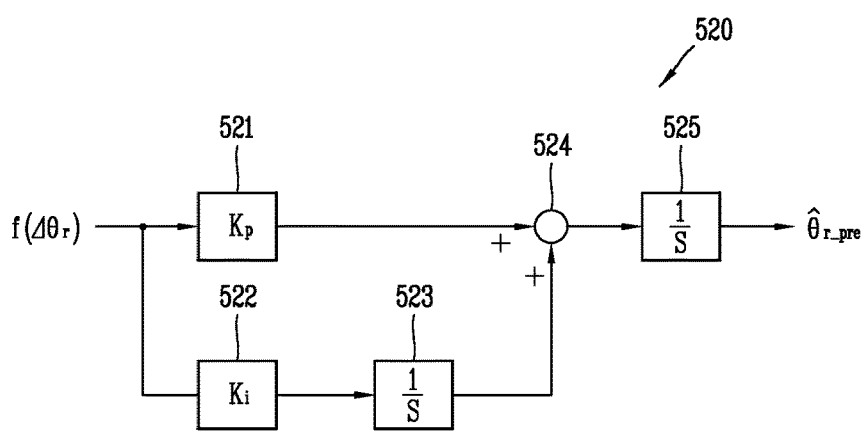
FIG. 7 is a detailed configuration view of a position estimator shown in FIG. 5.
Figure 8:
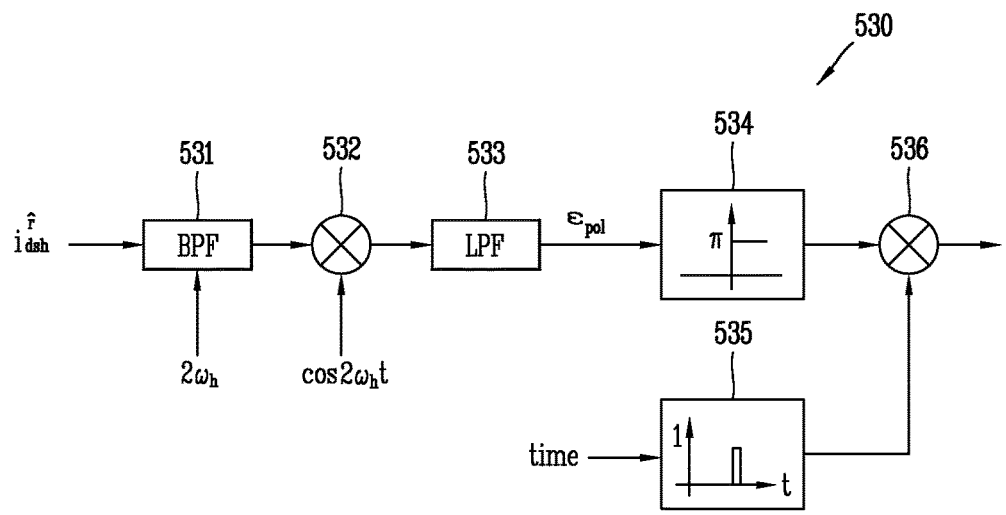
FIG. 8 is a detailed configuration view of a magnetic pole determination portion shown in FIG. 5.

FIG. 5 is a configuration view for explaining an initial position estimator according to a first embodiment. FIG. 6 is a detailed configuration view of a signal processor shown in FIG. 5. FIG. 7 is a detailed configuration view of a position estimator shown in FIG. 5. And FIG. 8 is a detailed configuration view of a magnetic pole determination portion shown in FIG. 5.

Referring to FIG. 5, the initial position estimator 5 may include a signal processor 510, a position estimator 520, a magnetic pole determination portion 530, and a first addition portion 540.

The signal processor 510 detects an angular error component from a high frequency q-axis current of an estimated rotor reference frame. The angular error may be represented as $\Delta\theta_r$, and may be expressed as the following formula 9. As shown in FIG. 6, the signal processor 510 may include a multiplier 511 and a low band pass filter 512. The multiplier 511 multiplies the high frequency q-axis current of the estimated rotor reference frame $$(i_{qsh}^r),$$

with the same frequency component as an applied high frequency voltage ($-\sin n\omega_h t$). And the low band pass filter 512 filters a low frequency component, thereby outputting a signal $f(\Delta\theta_r)$ including the angular error component. If it is assumed that the angular error component having passed through the low band pass filter 512 has a small angular error, the angular error may be represented as the following formula 10.

$$\Delta\theta_r = \theta_r - \hat{\theta}_r \quad \text{[Formula 9]}$$

$$f(\Delta\theta_r) \equiv LPF(-i_{qsh}^r \sin\omega_h t) = \quad \text{[Formula 10]}$$
$$\frac{V_{inj}(L_{dh}^r - L_{qh}^r)}{4\omega_h L_{dh}^r L_{qh}^r}\sin 2\Delta\theta_r \approx \frac{V_{inj}(L_{dh}^r - L_{qh}^r)}{2\omega_h L_{dh}^r L_{qh}^r}\Delta\theta_r$$

Here, the $L_{dh}^r$ and $L_{qh}^r$ represent a d-axis high frequency inductance and a q-axis high frequency inductance, respectively.

The position estimator 520 estimates an electrical position of the rotor from the angular error component extracted from the signal processor 510. As shown in FIG. 7, the position estimator 520 may include a first application portion 521, a second application portion 522, a first integral portion 523, a second addition portion 524 and a second integral portion 525. The first application portion 521 applies a proportional gain $K_p$ to $f(\Delta\theta_r)$, and the second application portion 522 applies an integral gain $K_i$ to $f(\Delta\theta_r)$. The first integral portion 523 integrates an output of the second application portion 522. The second addition portion 524 adds an output of the first application portion 521, to an output of the first integral portion 523. And the second integral portion 525 integrates an output of the second addition portion 524, thereby estimating an electrical position of the rotor.

The magnetic pole determination portion 530 determines a magnetic pole of an initial position of the rotor, by using a hysteresis phenomenon of the PMSM 6. That is, the magnetic pole determination portion 530 distinguishes a d-axis and a −d-axis of the rotor reference frame from each other. The magnetic pole determination portion 530 outputs 0 rad when an estimated initial position of the zo rotor is on the d-axis, and outputs π rad when the estimated initial position of the rotor is on the −d-axis.

The initial position estimation based on a high frequency input uses a saliency of a high frequency inductance. In this case, the d-axis and the −d-axis of the rotor reference frame have the same inductance, and have different signs of a magnetic flux generated from the PMSM 6. Accordingly, it is impossible to distinguish the d-axis and the −d-axis of the rotor reference frame from each other. As a result, an initial position may be estimated from the d-axis and the −d-axis.

Generally, if a magnetic field is applied to a ferromagnetic substance from the outside, magnetic domains arbitrarily arranged in the ferromagnetic substance are arranged in a direction of the magnetic field, thereby magnetizing the ferromagnetic substance. However, there is a delay between a time when the magnetic field is applied, and a time when the magnetic domains are arranged in the direction of the magnetic field. Further, when the magnetic field is removed, the magnetic domains do not return to the original state but have a remaining magnetic flux density. Such a phenomenon is called a hysteresis, and a hysteresis curve or a hysteresis loop means a representation of the hysteresis by a relation between a magnetic flux density and a magnetic field.

Under such a hysteresis, a current induced when a voltage is applied has a different form according to whether an initial position of the rotor is on the d-axis or −d-axis. If the initial position of the rotor is on the d-axis, a flux linkage due to a permanent magnet occurs from the rotor to a stator. On the other hand, if the initial position of the rotor is on the −d-axis, the flux linkage occurs from the stator to the rotor. Thus, a magnetic saturation occurs more when the initial position of the rotor is on the d-axis, than when the initial position of the rotor is on the −d-axis. A current induced when the same voltage is applied has a different size by such a magnetic saturation. Accordingly, a magnetic pole can be determined by using such a phenomenon.

The magnetic pole determination portion 530 applies a voltage of a sine wave, and determines a magnetic pole by using that a second harmonic component of an induced current has a different signal according to whether an initial position of the rotor is on the d-axis or −d-axis. The magnetic pole determination portion 530 determines a sign of a second harmonic wave signal of an induced current, thereby determining a magnetic pole of the initial position of the rotor.

As shown in FIG. 8, the magnetic pole determination portion 530 may include a band pass filter (BPF) 531, a multiplier 532, a low band pass filter (LPF) 533, a determination portion 534, a providing portion 535 and a multiplier 536. A center frequency of the band pass filter (BPF) 531 is $2\omega_h$, and is used to extract a second harmonic wave of a d-axis current of an estimated rotor reference frame. The multiplier 532 multiplies an output of the BPF 531 by $\cos 2\omega_h t$, in order to extract the second harmonic component of the d-axis current. The low band pass filter (LPF) 533 passes a signal of a low frequency band of an output of the multiplier 532, and may be expressed as the following formula 11. When an electrical position of the rotor is on the d-axis of the rotor reference frame, $\varepsilon_{pol}$ is represented as a negative value (−). On the other hand, when an electrical position of the rotor is on the −d-axis of the rotor reference frame, $\varepsilon_{pol}$ is represented as a positive value (+).

$$\varepsilon_{pol} \equiv LPF(\tilde{i}_{dsh}^r \cos 2\omega_h t) = -\frac{1}{8} \frac{V_{inj}^2}{\omega_h^2} \frac{d^2 i_{ds}^r}{d\lambda_{ds}^{r2}} \bigg|_{\lambda_{ds}^r = \lambda_{PM}} \cos^3 \Delta\theta_r \quad \text{[Formula 11]}$$

The determination portion 534 outputs 0 rad when the $\varepsilon_{pol}$ has a negative sign (−), and outputs π rad when the $\varepsilon_{pol}$ has a positive sign (+). The providing portion 535 provides a delta function which becomes 1 after a predetermined time lapses, and the multiplier 536 multiplies an output of the determination portion 534 by an output of the providing portion 535. That is, magnetic pole determination information is provided after a predetermined time lapses.

The first addition portion 540 may add an electrical position of the rotor estimated from the position estimator 520, to the magnetic pole determination information outputted from the magnetic pole determination portion 530, thereby outputting the initial position of the rotor. If the $\varepsilon_{pol}$ has a negative value, the initial position of the rotor is on the d-axis of the rotor reference frame. Accordingly, the first addition portion 540 may output the initial position of the rotor by using an electrical position without correction. On the other hand, if the $\varepsilon_{pol}$ has a positive value (+), the initial position of the rotor is on the −d-axis of the rotor reference frame. Accordingly, the first addition portion 540 may output the initial position of the rotor by adding π to an electrical position. This is expressed as the following formula 12. Here, the $\hat{\theta}_{r\_pre}$ is an electrical position of the rotor estimated from the position estimator 520.

$$\begin{cases} \hat{\theta}_r = \hat{\theta}_{r\_pre} + \pi, & \varepsilon_{pol} \geq 0 \\ \hat{\theta}_r = \hat{\theta}_{r\_pre}, & \varepsilon_{pol} < 0 \end{cases} \quad \text{[Formula 12]}$$

Figure 9:
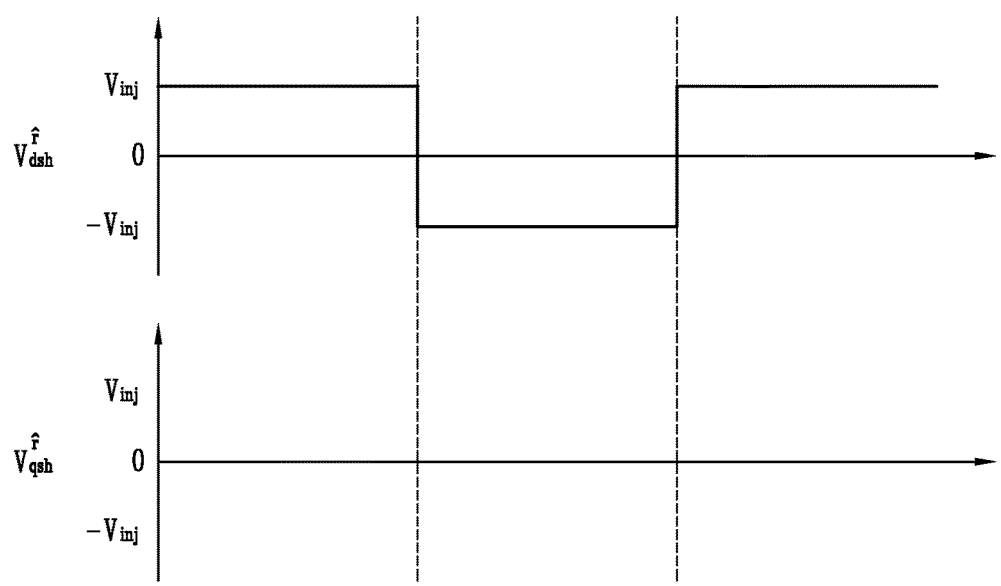
FIG. 9 is an exemplary view for explaining a form of a voltage generated by a high frequency signal processor according to a second embodiment.
Figure 10:
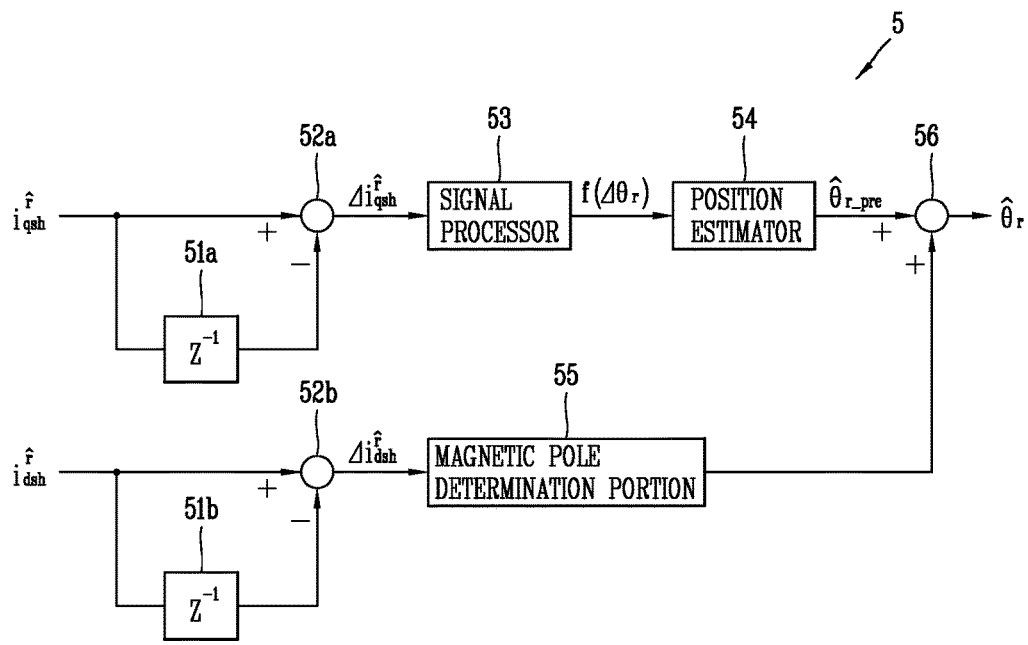
FIG. 10 is a configuration view for explaining an initial position estimator according to a second embodiment.
Figure 11:
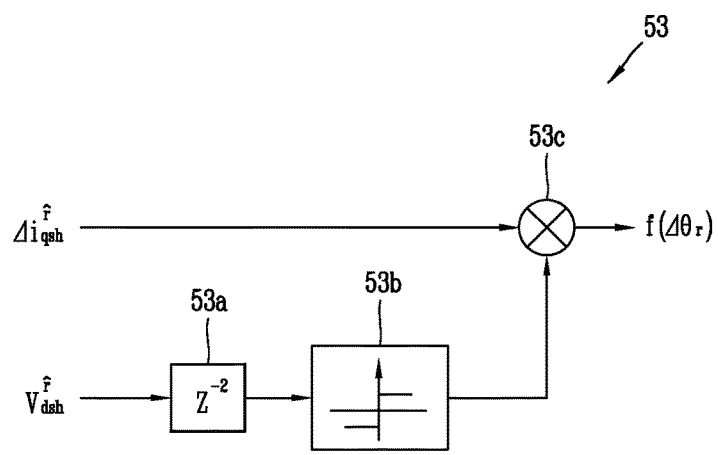
FIG. 11 is a detailed configuration view of a signal processor shown in FIG. 10.
Figure 12:
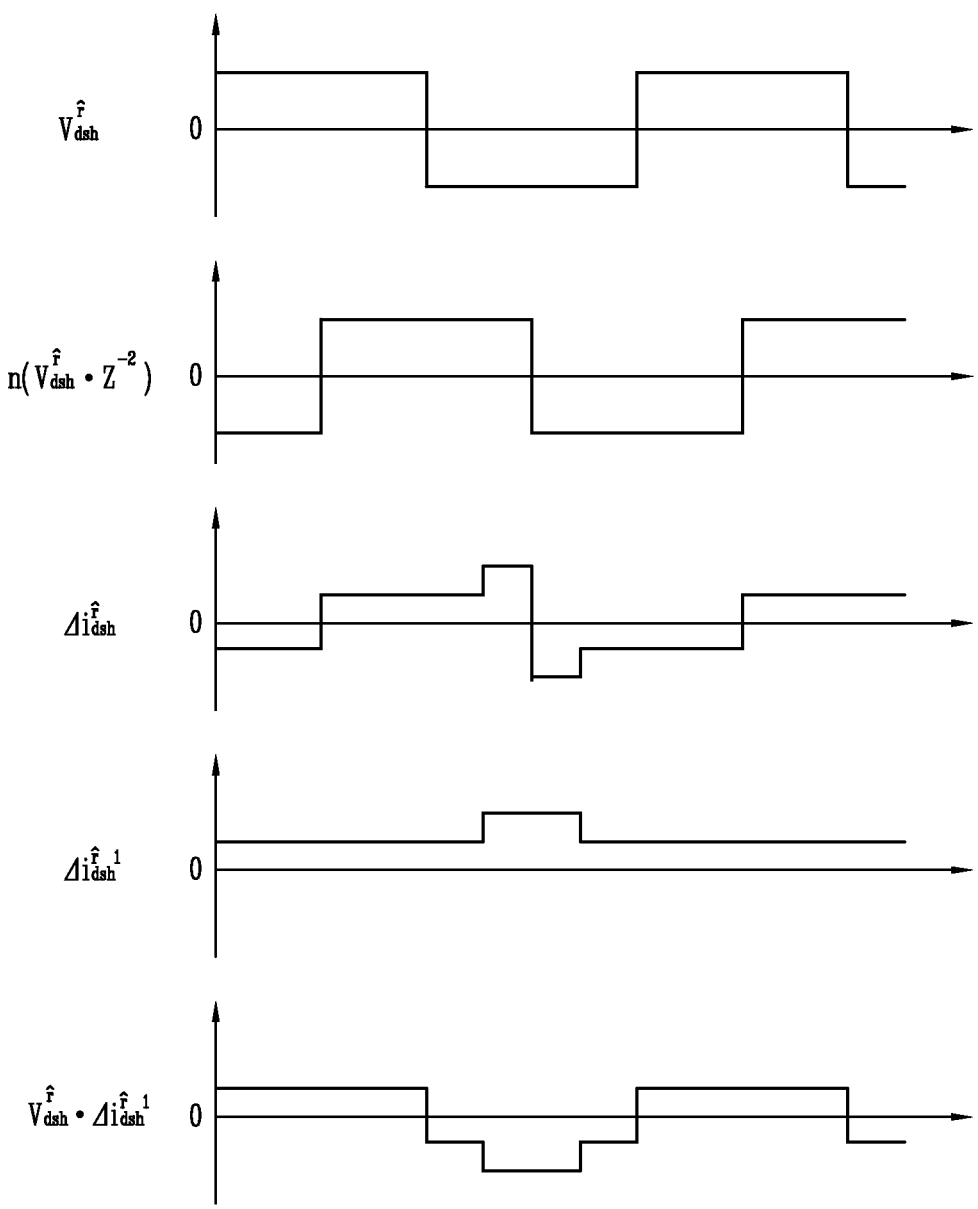
FIG. 12 is an exemplary view for explaining a principle that a magnetic pole determination portion of FIG. 10 determines a magnetic pole.
Figure 13:
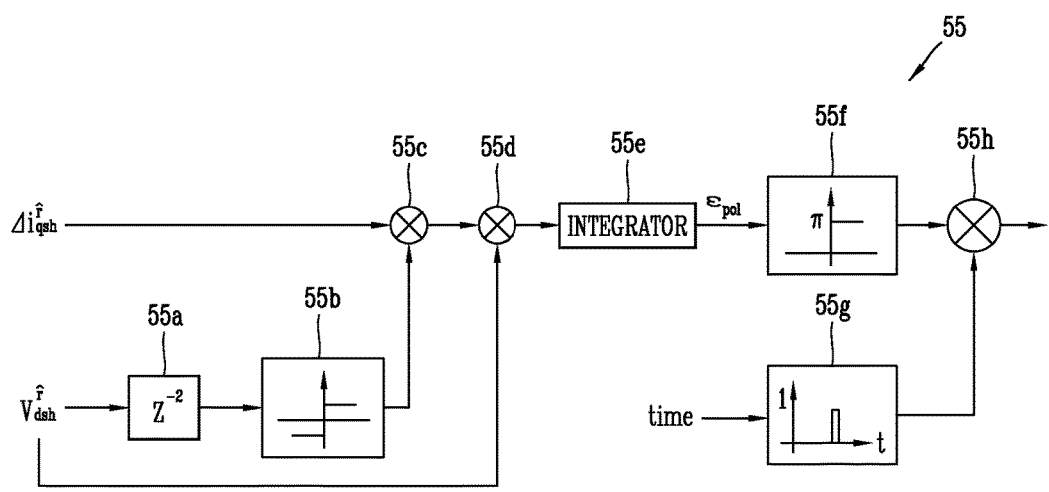
FIG. 13 is a detailed configuration view of the magnetic pole determination portion shown in FIG. 10.

FIG. 9 is an exemplary view for explaining a form of a voltage generated by a high frequency signal processor according to a second embodiment. FIG. 10 is a configuration view for explaining an initial position estimating apparatus according to a second embodiment, which shows the initial position estimator of FIG. 1. Hereinafter, the term of 'initial position estimating apparatus' will be used. FIG. 11 is a detailed configuration view of a signal processor shown in FIG. 10. FIG. 12 is an exemplary view for explaining a principle that a magnetic pole determination portion of FIG. 10 determines a magnetic pole. And FIG. 13 is a detailed configuration view of the magnetic pole determination portion shown in FIG. 10.

In the second embodiment, a high frequency voltage generated from the high frequency signal generator 1 is a square wave voltage, and a high frequency voltage command outputted from the high frequency signal generator 1 may be expressed as the following formula 13.

$$v_{dsh}^{r} = \begin{cases} V_{inj}, & halfduty \\ -V_{inj}, & otherwise \end{cases}, v_{qsh}^{r} = 0 \quad \text{[Formula 13]}$$

$V_{inj}$ may represent a size of an applied voltage.

Referring to FIG. 10, an initial position estimating apparatus 5 may include a first delay portion 51a, a second delay portion 51b, a first operation portion 52a, a second operation portion 52b, a signal processor 53, a position estimator 54, a magnetic pole determination portion 55, and a first addition portion 56.

The first delay portion 51a may delay a high frequency q-axis current $$i_{qsh}^{r}$$

of an estimated rotor reference frame by one sampling period. And the second delay portion 51b may delay a high frequency d-axis current $$i_{dsh}^{r}$$

of an estimated rotor reference frame by one sampling period.

The first operation portion 52a may obtain a difference between a currently-estimated q-axis current and a q-axis current delayed by one sampling period. And the second operation portion 52b may obtain a difference between a currently-estimated d-axis current and a d-axis current delayed by one sampling period. The difference between a present current and a current delayed by one sampling period means a change amount of a current. And a change amount of a d-axis current of an estimated rotor reference frame may be represented as $$\Delta i_{dsh}^{r},$$

and a change amount of a q-axis current may be represented as $$\Delta i_{qsh}^{r}.$$

The d-axis current and the q-axis current of the estimated rotor reference frame, induced for a square wave half period, may be represented as the following formula 14. A differential operator of a current with respect to a time means a change amount of a current with respect to a time. Accordingly, if a sampling period is expressed as ΔT, the change amount of the d-axis current of the estimated rotor reference frame, and the change amount of the q-axis current may be represented as the following formula 15.

$$\frac{d}{dt}\begin{bmatrix} i_{dsh}^r \\ i_{qsh}^r \end{bmatrix} = V_{inj} \begin{bmatrix} \left(\frac{1}{2L_{dh}^r} - \frac{1}{2L_{qh}^r}\right)\cos 2\Delta\theta_r + \\ \left(\frac{1}{2L_{dh}^r} + \frac{1}{2L_{qh}^r}\right) \\ \left(\frac{1}{2L_{dh}^r} - \frac{1}{2L_{qh}^r}\right)\sin 2\Delta\theta_r \end{bmatrix} \quad \text{[Formula 14]}$$

$$\begin{bmatrix} i_{dsh}^r \\ i_{qsh}^r \end{bmatrix} = V_{inj}\Delta T \begin{bmatrix} \left(\frac{1}{2L_{dh}^r} - \frac{1}{2L_{qh}^r}\right)\cos 2\Delta\theta_r + \\ \left(\frac{1}{2L_{dh}^r} + \frac{1}{2L_{qh}^r}\right) \\ \left(\frac{1}{2L_{dh}^r} - \frac{1}{2L_{qh}^r}\right)\sin 2\Delta\theta_r \end{bmatrix} \quad \text{[Formula 15]}$$

Here, the change amount of the q-axis current of the estimated rotor reference frame is $$V_{inj}\Delta T\left(\frac{1}{2L_{dh}^r} - \frac{1}{2L_{qh}^r}\right)\sin 2\Delta\theta_r.$$

If it is assumed that an angular error is small, an equation of $$V_{inj}\Delta T\left(\frac{1}{L_{dh}^r} - \frac{1}{L_{qh}^r}\right)\Delta\theta_r$$

is satisfied. Thus, an angular error component may be obtained from the change amount of the q-axis current of the rotor reference frame.

As shown in FIG. 9, a sign of a voltage applied to the d-axis of the estimated rotor reference frame is changed per half period. Accordingly, a signal processing is required such that the change amount of the q-axis current is maintained regardless of the sign of the applied voltage. Considering a current measurement delay, a current change amount occurs after two sampling periods after a voltage is applied.

Thus, the signal processor 53 may perform a signal processing by using a sign of an applied voltage delayed by two sampling periods. That is, the signal processor 53 may obtain a signal including the angular error component, based on the change amount of the q-axis current of the estimated rotor reference frame. As shown in FIG. 11, the signal processor 53 may include a third delay portion 53a, a first sign determination portion 53b, and a third operation portion 53c. The third delay portion 53a may delay a d-axis voltage of an estimated rotor reference frame by two sampling periods, and the first code determination portion 53b may determine a sign of the d-axis voltage delayed by two sampling periods. The third operation portion 53c may multiply the sign of the high-frequency d-axis voltage delayed by two sampling period by the change amount of the q-axis current of the estimated rotor reference frame. An output of the third operation portion 53c means an angular error component, and may be represented as the following formula 16.

$$f(\Delta\theta_r) = \Delta i_{qsh}^{\hat{r}}{}' = \text{sign}(v_{dsh}^{\hat{r}} \cdot z^{-2})\Delta i_{qsh}^{\hat{r}} \quad \text{[Formula 16]}$$

Here, the sign ( ) means a function to obtain a sign.

The position estimator 54 may estimate an electrical position of the rotor, from the angular error component determined by the signal processor 53. Here, the position estimator 54 may have the same configuration as the position estimator 520 shown in FIG. 7. As shown in FIG. 7, the position estimator 54 may include a first application portion 521, a second application portion 522, a first integral portion 523, a second addition portion 524 and a second integral portion 525. The first application portion 521 applies a proportional gain $K_p$ to the $f(\Delta\theta_r)$, and the second application portion 522 applies an integral gain $K_i$ to the $f(\Delta\theta_r)$. The first integral portion 523 integrates an output of the second application portion 522. The second addition portion 524 adds an output of the first application portion 521, to an output of the first integral portion 523. And the second integral portion 525 re-integrates an output of the second addition portion 524, thereby estimating the electrical position of the rotor.

The magnetic pole determination portion 55 determines a magnetic pole of an initial position of the rotor, by using a hysteresis phenomenon of the PMSM 6. That is, the magnetic pole determination portion 55 distinguishes d-axis and −d-axis of the rotor reference frame from each other. The magnetic pole determination portion 55 may output 0 rad when an estimated initial position of the rotor is on the d-axis, and may output π rad when the estimated initial position of the rotor is on the −d-axis. Under such a hysteresis, a current induced when a voltage is applied may have a different form according to whether the initial position of the rotor is on the d-axis or −d-axis, as shown in FIG. 12. The reason is as follows. If the initial position of the rotor is on the d-axis, a flux linkage due to a permanent magnet occurs from the rotor to a stator. On the other hand, if the initial position of the rotor is on the −d-axis, the flux linkage occurs from the stator to the rotor. Thus, a magnetic saturation occurs more when the initial position of the rotor is on the d-axis, than when the initial position of the rotor is on the −d-axis. A current induced when the same voltage is applied has a different size by such a magnetic saturation. Accordingly, a magnetic pole can be determined by using such a phenomenon. The magnetic pole determination portion 55 may determine a magnetic pole by using a fundamental wave component of the change amount of the d-axis current of the estimated rotor reference frame obtained from the formula 16.

Since the initial position of the rotor is on the d-axis, a current change amount becomes larger by a saturation phenomenon when a positive voltage (+) is applied. Thus, there is a difference between a positive peak current and a negative peak current. The change amount $$\Delta i_{dsh}^{\hat{r}}{}'$$

of the d-axis current after a signal processing corresponding to an absolute value of the current change amount is not constant, and an error corresponding to a current peak occurs. This means that a fundamental wave is included after a signal processing corresponding to an absolute value of a corresponding signal, because a second harmonic wave is included in not only a current induced by a hysteresis, but also a current change amount.

The fundamental wave may be extracted by multiplying an applied high frequency signal corresponding to the fundamental wave, by the change amount $$\Delta i_{dsh}^{\hat{r}}{}'$$

of the d-axis current after the signal processing. A value $$v_{dsh}^{\hat{r}} \Delta i_{dsh}^{\hat{r}}{}'$$

obtained by multiplying the applied square wave by the change amount of the d-axis current after the signal processing has the same period when it is positive or negative. However, there is a difference corresponding to a peak of the change amount of the d-axis current after the signal processing, due to a saturation phenomenon. That is, if a corresponding signal is integrated, a value corresponding to a difference between a maximum value and a minimum value is accumulated. Thus, a corresponding integration signal may be used to determine a magnetic pole.

When the initial position of the rotor is on the d-axis of the rotor reference frame, the integration signal of the $$v_{dsh}^r \Delta i_{dsh}^{r\prime}$$

may be negative. On the other hand, when the initial position of the rotor is on the −d-axis of the rotor reference frame, the integration signal of the $$v_{dsh}^r \Delta i_{dsh}^{r\prime}$$

may be positive. Based on such a result, a magnetic pole of the initial position of the rotor may be determined by using the fundamental wave component of the change amount of the d-axis current after a signal processing. When a magnetic pole determination signal is defined as $\varepsilon_{pol}$, the $\varepsilon_{pol}$ may be expressed as the following formula 17.

$$\varepsilon_{pol} \equiv \int_{T_0}^{T_1} v_{dsh}^r \Delta i_{dsh}^{r\prime} dt \qquad \text{[Formula 17]}$$

As shown in FIG. 13, the magnetic pole determination portion 55 may include a fourth delay portion 55a, a second sign determination portion 55b, a fourth operation portion 55c, a fifth operation portion 55d, an integrator 55e, a determination portion 55f, a providing portion 55g and a sixth operation portion 55h. The fourth delay portion 55a may delay a d-axis voltage of an estimated rotor reference frame by two sampling periods. The second sign determination portion 55b may determine a sign of the d-axis voltage delayed by two sampling periods. The fourth operation portion 55c may multiply the sign of the d-axis voltage delayed by two sampling periods, by a change amount of a d-axis current of the estimated rotor reference frame. The fifth operation portion 55d may operate $$v_{dsh}^r \Delta i_{dsh}^{r\prime},$$

by multiplying the sign of the d-axis voltage delayed by two sampling periods, and the change amount of the d-axis current of the estimated rotor reference frame, by a d-axis voltage of the estimated rotor reference frame. The integrator 55e may integrate the $$v_{dsh}^r \Delta i_{dsh}^{r\prime}$$

to output the magnetic pole determination signal $\varepsilon_{pol}$. The determination portion 55f may output 0 rad when the $\varepsilon_{pol}$ has a negative sign (−), and may output π rad when the $\varepsilon_{pol}$ has a positive sign (+). The providing portion 55g may provide a delta function which becomes 1 after a predetermined time lapses. And the sixth operation portion 55h may output magnetic pole determination information after a predetermined time lapses, by multiplying the delta function by an output of the determination portion 55f.

The first addition portion 56 may add the position of the rotor $\hat{\theta}_{r\_pre}$ estimated by the position estimator 54, to the magnetic pole determination information determined by an estimated magnetic pole position provided from the magnetic pole determination portion 55, thereby outputting a finally-estimated initial position of the rotor. If the $\varepsilon_{pol}$ has a negative value, the first addition portion 56 may output the initial position of the rotor by using an electrical position estimated by the position estimator 54 without correction. On the other hand, if the $\varepsilon_{pol}$ has a positive value, the first addition portion 56 may output the initial position of the rotor by adding π to the electrical position estimated by the position estimator 54. This may be expressed as the following formula 18.

$$\begin{cases} \hat{\theta}_r = \hat{\theta}_{r\_pre} + \pi, & \varepsilon_{pol} \geq 0 \\ \hat{\theta}_r = \hat{\theta}_{r\_pre}, & \varepsilon_{pol} < 0 \end{cases} \qquad \text{[Formula 18]}$$

In the second embodiment, the initial position estimating apparatus 5 may correctly determine an initial position of the rotor of the motor by reducing a computational complexity, based on the fundamental wave component of the change amount of the d-axis current of the estimated rotor reference frame when a high frequency voltage of a square wave is applied.

In various embodiments, the initial position estimating apparatus 5 may include a signal processor 53 for outputting an angular error component from a change amount of a q-axis current in an estimated rotor reference frame, a position estimator 54 for estimating an electrical position of the rotor from the angular error component, a magnetic pole determination portion 55 for outputting magnetic pole determination information according to a sign of a magnetic pole determination signal determined based on a change amount of a d-axis current in the estimated rotor reference frame and based on a d-axis voltage, and a first addition portion 56 for outputting an initial position of the rotor by adding the magnetic pole determination information to the electrical position.

In various embodiments, the magnetic pole determination portion 55 may determine the magnetic pole determination signal based on the fundamental wave component of the change amount of the d-axis current.

In various embodiments, the initial position estimating apparatus 5 may further include a first delay portion 51a for delaying the q-axis current, a second delay portion 51b for delaying the d-axis current, a first operation portion 52a for determining the change amount of the q-axis current by operating a difference between the q-axis current and the delayed q-axis current, and a second operation portion 52b for determining the change amount of the d-axis current by operating a difference between the d-axis current and the delayed d-axis current.

In various embodiments, the first and second delay portions 51a, 51b may delay the q-axis current and the d-axis current by one sampling period, respectively.

In various embodiments, the signal processor 53 may delay the d-axis voltage, and may output the angular error component by using a sign of the delayed d-axis voltage and the change amount of the q-axis current.

In various embodiments, the signal processor 53 may include a third delay portion 53a for delaying the d-axis voltage by the predetermined sampling period, a first sign determination portion 53b for determining a sign of the delayed d-axis voltage, and a third operation portion 53*c* for outputting the angular error component by multiplying the sign of the delayed d-axis voltage by the change amount of the q-axis current.

In various embodiments, the third delay portion 53*a* may delay the d-axis voltage by two sampling periods.

In various embodiments, the position estimator 54 may include a first application portion 521 for applying a proportional gain to the angular error component, a second application portion 522 for applying an integral gain to the angular error component, a first integral portion 523 for integrating an output of the second application portion 522, a second addition portion 524 for adding an output of the first application portion 521 to an output of the first integral portion 523, and a second integral portion 525 for integrating an output of the second addition portion 524 to determine the electrical position of the rotor.

In various embodiments, the magnetic pole determination information may be $\pi$ when the magnetic pole determination signal has a positive sign, and may be 0 when the magnetic pole determination signal has a negative sign.

In various embodiments, the magnetic pole determination portion 55 may include a fourth delay portion 55*a* for delaying the d-axis voltage, a second sign determination portion 55*b* for determining a sign of the delayed d-axis voltage, a fourth operation portion 55*c* for multiplying the sign of the delayed d-axis voltage by the change amount of the d-axis current, a fifth operation portion 55*d* for multiplying an output of the fourth operation portion 55*c* by the d-axis voltage, and an integrator 55*e* for integrating an output of the fifth operation portion 55*d* and thereby outputting the magnetic pole determination signal.

In various embodiments, the magnetic pole determination portion 55 may further include a determination portion 55*f* for outputting a first angle when the magnetic pole determination signal has a positive sign, and for outputting a second angle when the magnetic pole determination signal has a negative sign; a providing portion 55*g* for providing a delta function which becomes 1 after a predetermined time lapses; and a sixth operation portion 55*h* for outputting the magnetic pole determination information by multiplying the delta function by an output of the determination portion 55*f*.

In various embodiments, the first angle may be $\pi$, and the second angle may be 0.

In various embodiments, if the magnetic pole determination signal has a positive sign, the first addition portion 56 may add $\pi$ to the electrical position to determine the initial position.

In various embodiments, if the magnetic pole determination signal has a negative sign, the first addition portion 56 may determine the electrical position as the initial position.

In various embodiments, the fourth delay portion 55*a* may delay the d-axis voltage by two sampling periods.

In various embodiments, an initial position estimating method may include determining an angular error component from a change amount of a q-axis current in an estimated rotor reference frame; estimating an electrical position of the rotor from the angular error component; determining magnetic pole determination information according to a sign of a magnetic pole determination signal determined based on a change amount of a d-axis current in the estimated rotor reference frame and based on a d-axis voltage; and determining an initial position of the rotor by adding the magnetic pole determination information to the electrical position.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A permanent magnet synchronous machine (PMSM), the PMSM comprising:
 a signal processor for outputting an angular error component from a change amount of a q-axis current in an estimated rotor reference frame;
 a position estimator for estimating an electrical position of a rotor from the angular error component;
 a magnetic pole determination portion for outputting magnetic pole determination information according to a sign of a magnetic pole determination signal determined based on a change amount of a d-axis current in the estimated rotor reference frame and based on a d-axis voltage; and
 a first addition portion for outputting an initial position of the rotor by adding the magnetic pole determination information to the electrical position,
 wherein the PMSM controls a torque of the rotor based on the initial position of the rotor, and
 wherein the magnetic pole determination information is $\pi$ when the magnetic pole determination signal has a positive sign, and is 0 when the magnetic pole determination signal has a negative sign.

2. The PMSM of claim 1, wherein the magnetic pole determination portion determines the magnetic pole determination signal based on a fundamental wave component of the change amount of the d-axis current.

3. The PMSM of claim 1, further comprising:
 a first delay portion for delaying the q-axis current;
 a second delay portion for delaying the d-axis current;
 a first operation portion for determining the change amount of the q-axis current by operating a difference between the q-axis current and the delayed q-axis current; and
 a second operation portion for determining the change amount of the d-axis current by operating a difference between the d-axis current and the delayed d-axis current.

4. The PMSM of claim 3, wherein the first and second delay portions delay the q-axis current and the d-axis current by one sampling period, respectively.

5. The PMSM of claim 1, wherein the signal processor delays the d-axis voltage, and outputs the angular error component by using a sign of the delayed d-axis voltage and the change amount of the q-axis current.

6. The PMSM of claim 5, wherein the signal processor includes:
 a third delay portion for delaying the d-axis voltage by a predetermined sampling period;
 a first sign determination portion for determining the sign of the delayed d-axis voltage; and
 a third operation portion for determining the angular error component by multiplying the sign of the delayed d-axis voltage by the change amount of the q-axis current.

7. The PMSM of claim 6, wherein the third delay portion delays the d-axis voltage by two sampling periods.

8. The PMSM of claim 1, wherein the position estimator includes:

a first application portion for applying a proportional gain to the angular error component;

a second application portion for applying an integral gain to the angular error component;

a first integral portion for integrating an output of the second application portion;

a second addition portion for adding an output of the first application portion to an output of the first integral portion; and a second integral portion for integrating an output of the second addition portion to determine the electrical position of the rotor.

9. The PMSM of claim 1, wherein the magnetic pole determination portion includes:

a fourth delay portion for delaying the d-axis voltage;

a second sign determination portion for determining a sign of the delayed d-axis voltage;

a fourth operation portion for multiplying the sign of the delayed d-axis voltage by the change amount of the d-axis current;

a fifth operation portion for multiplying an output of the fourth operation portion by the d-axis voltage; and an integrator for integrating an output of the fifth operation portion and thereby outputting the magnetic pole determination signal.

10. The PMSM of claim 9, wherein the magnetic pole determination portion further includes:

a determination portion for outputting a first angle when the magnetic pole determination signal has a positive sign, and for outputting a second angle when the magnetic pole determination signal has a negative sign;

a providing portion for providing a delta function which becomes 1 after a predetermined time lapses; and a sixth operation portion for outputting the magnetic pole determination information by multiplying the delta function by an output of the determination portion.

11. The PMSM of claim 10, wherein the first angle is $\pi$, and the second angle is 0.

12. The PMSM of claim 1, wherein if the magnetic pole determination signal has a positive sign, the first addition portion adds $\pi$ to the electrical position to determine the initial position.

13. The PMSM of claim 1, wherein if the magnetic pole determination signal has a negative sign, the first addition portion determines the electrical position as the initial position.

14. The PMSM of claim 9, wherein the fourth delay portion delays the d-axis voltage by two sampling periods.

15. A controlling method for a permanent synchronous machine (PMSM), the method comprising:

determining an angular error component from a change amount of a q-axis current in an estimated rotor reference frame;

estimating an electrical position of a rotor from the angular error component;

determining magnetic pole determination information according to a sign of a magnetic pole determination signal determined based on a change amount of a d-axis current in the estimated rotor reference frame and based on a d-axis voltage;

determining an initial position of the rotor by adding the magnetic pole determination information to the electrical position; and controlling a torque of the rotor based on the initial position of the rotor, wherein the magnetic pole determination information is $\pi$ when the magnetic pole determination signal has a positive sign, and is 0 when the magnetic pole determination signal has a negative sign.

* * * * *